E. ROBLIN.
BRAKE FOR AUTOMOBILE TRUCKS.
APPLICATION FILED NOV. 19, 1913.
1,103,540.
Patented July 14, 1914.
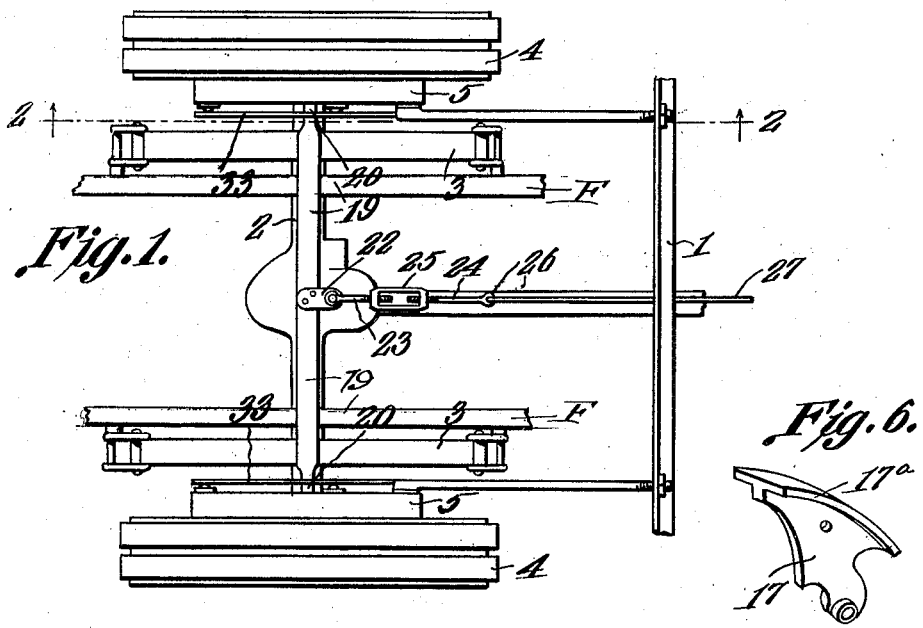
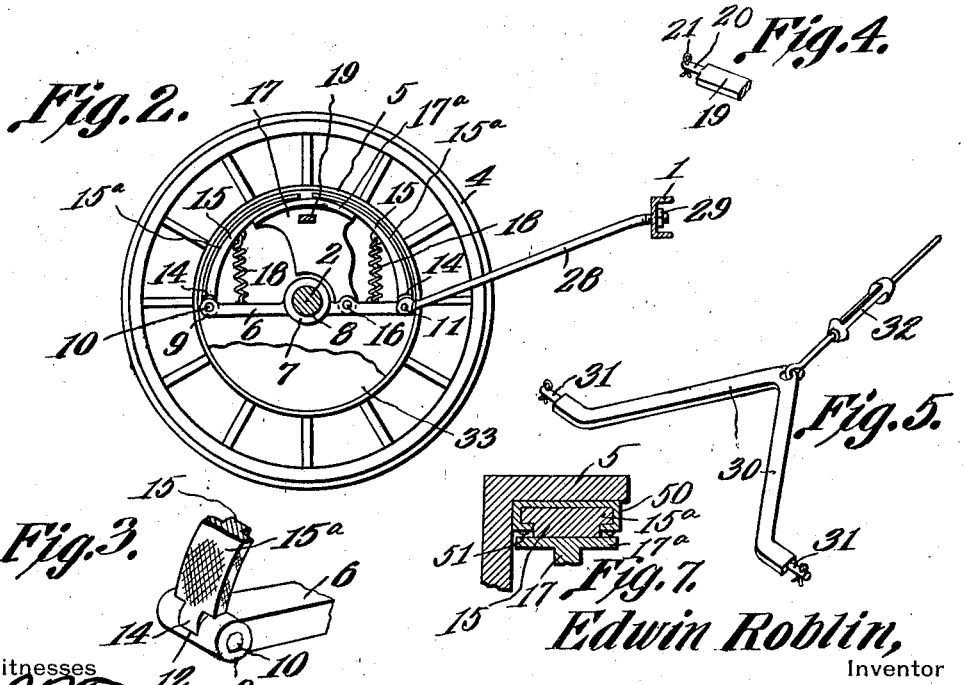
Edwin Roblin,
Inventor

UNITED STATES PATENT OFFICE.

EDWIN ROBLIN, OF TOLEDO, OHIO.

BRAKE FOR AUTOMOBILE-TRUCKS.

1,103,540.   Specification of Letters Patent.   Patented July 14, 1914.

Application filed November 19, 1913. Serial No. 801,906.

*To all whom it may concern:*

Be it known that I, EDWIN ROBLIN, a citizen of the United States, residing at Toledo, in the county of Lucas and State of Ohio, have invented a new and useful Brake for Automobile-Trucks, of which the following is a specification.

The device forming the subject matter of this application is a vehicle brake, and one object of the present invention is to provide a brake of the sort above mentioned which, through the medium of a simple mechanism, will afford a strong hold upon the drum of a wheel, to resist the rotation of the wheel.

Another object of the invention is to provide a novel means for supporting the brake and for assembling the same with the vehicle mechanism.

The invention aims further to provide a vehicle brake, the shoes of which, without the use of springs, will at all times be maintained in operative relation to the eccentric whereby the shoes are actuated.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows in top plan, a portion of a vehicle to which the brake constituting the subject matter of the present application has been applied; Fig. 2 is a section on the line 2—2 of Fig. 1, parts being removed; Fig. 3 is a fragmental perspective showing one end of the shoe support; Fig. 4 is a fragmental perspective showing one end of the connecting bar which extends between the eccentric; Fig. 5 is a perspective illustrating a modified form of connecting bar. Fig. 6 is a perspective view of the eccentric; Fig. 7 is a fragmental section of the drum and adjacent parts, the view showing a modification.

Referring to the drawings, the numeral 1 indicates a portion of a frame F of a vehicle, the rear axle being indicated at 2.

The springs are shown at 3 and the numeral 4 indicates the wheels of a vehicle, the same being provided upon their adjacent, inner faces with drums 5.

Located within the drums 5 and ordinarily disposed horizontally, are supports 6 provided intermediate their ends with bosses 7 having openings 8 adapted to receive the ends of the axle 2. The supports 6 are provided at their ends with bearings 9 receiving pivot elements 10 and 11, the bearings 9, if desired, being notched longitudinally, to receive knuckles 14 formed upon the lower ends of the curved shoes 15 which are located within the contour of the drums 5, the knuckles 14 of the shoes 15 being mounted to swing on the pivot elements 10 and 11, and being provided with flanges 15$^a$.

Located within each drum 5 and within the space defined by the overhanging ends of the shoes 15 and the support 6 is an eccentric 17 having a flange 17$^a$ adapted to bear upon the inner faces of the shoes 15, adjacent the ends of the shoes. Especial attention is directed to the fact that the supports 16 are disposed horizontally or nearly so, and that the upper, inner ends of the shoes 15 overhang the supports 6. Owing to the foregoing construction, the upper ends of the shoes 15 are maintained gravitationally in engagement with the eccentrics 17, and springs of any sort may be dispensed with entirely. If desired, however, springs 18 may connect the brake shoes 15 with the supports 6, for the purpose of holding the upper ends of the shoes down upon the eccentrics 17, thereby avoiding rattling or unnecessary noise.

The eccentrics 17 upon the opposite sides of the vehicle are united by a connection, which may be of any desired form. In the present instance, the connection is shown in the form of a bar 19. This bar 19 may be formed integrally with the eccentrics 17 or may be secured thereto in any desired manner. As shown, the bar 19 is provided at its ends with reduced spindles 20 which extend through the eccentrics 17, cotter pins or the like shown at 21 being inserted through the spindles 20, to hold the ends of the bar 19 assembled with the eccentrics 17. The bar 19 preferably is located above the springs 3. Secured to the intermediate portion of the bar 19 is a clevis 22 connected with a rod 23, coöperating with a rod 24, the rods 23 and 24 being threaded at their ends to receive a turn buckle 25. The rod 24 is pivotally connected at its forward end in any desired manner as indicated at 26 with the rear end of a forwardly extended actuating member 27 which may be a rod. It is to be noted at this point, that since the connecting bar 19 is located above the springs 3, the actuating member 27 may be disposed adjacent the longitudinal center of the vehicle, and therefore, the side portions of the vehicle frame are not encumbered by the brake actuating mechanism. In order to prevent the supports 6 from rotating on the axle 2 when the wheels 4 are rotated and when the brake shoes 15 are in engagement with the drums 5, the forward ends of the supports 6 are provided with arms 28. The arms 28 may be connected with the forward ends of the supports 6 in any desired manner. In the present instance, the arms 28 are connected with the supports by means of the pivot elements 11 which serve, also, to connect one shoe of each braking device with the forward end of the corresponding end of the support 6. As shown, the forward ends of the arms 28 enter the frame 1 and are secured thereto by means of nuts 29.

In some vehicles, the axle is not of the straight form indicated by the reference character 2. Under such circumstances, it may be desirable to shape the connecting member, represented by the element 19, accordingly. Such a construction is shown in Fig. 5, wherein the connecting member is arched intermediate its ends as shown at 30, any suitable means indicated at 31 being provided at the ends of the connecting bar for assembling the same with the extensions 17. In Fig. 5, the turn buckle structure hereinbefore described in detail is referred to generally by the reference character 32.

Although not mandatory, it may be desirable at times to protect the inner, open sides of the drums 5 by means of shields 33. Although these shields 33 may be upheld in any expedient manner, the same, in the present instance, as shown in Fig. 4, are upheld by the arms 28.

As shown in Fig. 7, a friction facing 50 may be extended transversely of the shoes 15 for coöperation with the drum 5, the edges of the facing being secured to the under surfaces of the flanges 15ª by means of attaching elements 51.

Having thus described the invention, what is claimed is:—

1. In a device of the class described, wheels journaled for rotation upon the ends of the axle and provided with drums; supports located within the drums and mounted on the axle; a shoe pivoted to each support and adapted to coöperate with the corresponding drum; an eccentric pivoted to each support and coöperating with the corresponding shoe to force the same outwardly against the drum; a connection uniting the eccentrics and disposed longitudinally of the axle; means for actuating the connection; and means for securing the supports against rotation with the wheels.

2. In a device of the class described, an axle; a wheel journaled on the axle; a drum carried by the wheel; a support carried by the axle and located within the contour of the drum; shoes coöperating with the drum and pivoted to the ends of the support; an eccentric pivoted to the support and engaging the inner faces of the shoes, the shoes being located above the support whereby the adjacent, inner edges of the shoes will rest gravitationally in engagement with the eccentric; means for operating the eccentric; and means for anchoring the support.

3. In a device of the class described, a frame; an axle carried thereby; a wheel journaled for rotation on the axle; a drum carried by the wheel; a support having an opening receiving the axle, the support including an arm extended beyond the periphery of the drum and connected with the frame; a shoe pivoted to the support and coöperating with the drum; an eccentric pivoted to the support coöperating with the shoe to force the same outwardly against the drum; and means for operating the eccentric.

4. In a device of the class described, a frame; an axle carried thereby; a wheel journaled on the axle; a drum carried by the wheel; a support located within the contour of the drum and having an opening receiving the axle; means for securing the support to the frame against rotation on the axle; shoes pivoted to the ends of the support and overhanging the support; springs connected with the shoes and with the support; an eccentric pivoted on the support and coöperating with the shoes; and means for operating the eccentric; the springs constituting yieldable means for maintaining the ends of the shoes in engagement with the eccentric, thereby to avoid rattling.

In testimony that I claim the foregoing as my own, I have hereto affixed my signature in the presence of two witnesses.

EDWIN ROBLIN.

Witnesses:
R. G. BOWE,
CLAYTON ZELUFF.